(12) United States Patent
Liu et al.

(10) Patent No.: US 8,363,873 B2
(45) Date of Patent: *Jan. 29, 2013

(54) EARPHONE CABLE AND EARPHONE USING THE SAME

(75) Inventors: Liang Liu, Beijing (CN); Jerry Wu, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 428 days.

This patent is subject to a terminal disclaimer.

(21) Appl. No.: 12/769,990

(22) Filed: Apr. 29, 2010

(65) Prior Publication Data

US 2011/0051973 A1  Mar. 3, 2011

(30) Foreign Application Priority Data

Aug. 25, 2009  (CN) .......................... 2009 1 0189819

(51) Int. Cl.
| | | |
|---|---|---|
| H04R 25/00 | (2006.01) | |
| H01B 7/17 | (2006.01) | |
| H01B 7/18 | (2006.01) | |
| H01B 11/18 | (2006.01) | |
| H01B 11/20 | (2006.01) | |
| H01B 7/00 | (2006.01) | |
| H01B 11/00 | (2006.01) | |

(52) U.S. Cl. ...................... 381/370; 381/384; 174/113 R

(58) Field of Classification Search .................. 381/370, 381/74, 309, 384; 174/102 C, 113 R, 115, 174/116, 126.2

See application file for complete search history.

(56) References Cited

U.S. PATENT DOCUMENTS

| | | | | |
|---|---|---|---|---|
| 1,521,275 | A * | 12/1924 | Carpenter et al. | 381/384 |
| 1,606,165 | A * | 11/1926 | Glenn | 381/384 |
| 4,318,588 | A * | 3/1982 | Zeidler et al. | 385/113 |
| 7,045,108 | B2 | 5/2006 | Jiang et al. | |
| 7,045,716 | B2 * | 5/2006 | Granheim | 174/102 SC |
| 7,050,601 | B2 * | 5/2006 | Suzuki et al. | 381/409 |
| 7,179,522 | B2 * | 2/2007 | Hiel et al. | 428/300.7 |
| 7,348,490 | B2 | 3/2008 | Sakai | |
| 7,413,474 | B2 * | 8/2008 | Liu et al. | 439/579 |
| 7,449,631 | B2 * | 11/2008 | Lee et al. | 174/28 |
| 7,459,627 | B2 * | 12/2008 | Lee et al. | 174/28 |
| 7,491,883 | B2 * | 2/2009 | Lee et al. | 174/28 |
| 7,750,240 | B2 * | 7/2010 | Jiang et al. | 174/102 R |
| 7,840,242 | B2 * | 11/2010 | Yoshino | 455/575.2 |
| 8,063,307 | B2 * | 11/2011 | Bukshpun et al. | 174/102 SC |
| 8,158,199 | B2 * | 4/2012 | Jiang et al. | 427/250 |
| 8,247,036 | B2 * | 8/2012 | Jiang et al. | 427/384 |

(Continued)

FOREIGN PATENT DOCUMENTS

| | | |
|---|---|---|
| CN | 101083159 A | 12/2007 |
| JP | 0339214 | 2/1991 |

(Continued)

*Primary Examiner* — Edgardo San Martin
(74) *Attorney, Agent, or Firm* — Altis Law Group, Inc.

(57) ABSTRACT

An earphone cable includes a first signal wire group, a second signal wire group, and a sheath layer. The first signal group includes at least one first conducting wire. The second signal wire group includes at least one second conducting wire, and the second signal wire group is insulated from the first signal wire group. At least one of the first signal wire group and the second signal wire group comprises at least one carbon nanotube wire. The sheath layer located about the first signal wire group and the second signal wire group.

20 Claims, 6 Drawing Sheets

U.S. PATENT DOCUMENTS

| | | |
|---|---|---|
| 2003/0161950 A1 | 8/2003 | Ajayan et al. |
| 2004/0020681 A1 | 2/2004 | Hjortstam et al. |
| 2005/0170177 A1* | 8/2005 | Crawford et al. ............. 428/375 |
| 2006/0228289 A1 | 10/2006 | Harutyunyan et al. |
| 2007/0151744 A1* | 7/2007 | Chen ......................... 174/110 R |
| 2007/0166223 A1 | 7/2007 | Jiang et al. |
| 2008/0254675 A1* | 10/2008 | Lee et al. ....................... 439/578 |
| 2009/0197082 A1 | 8/2009 | Jiang et al. |
| 2009/0255706 A1* | 10/2009 | Jiang et al. ................ 174/102 R |
| 2010/0038112 A1* | 2/2010 | Grether ....................... 174/128.1 |
| 2010/0078196 A1* | 4/2010 | Mclaughlin et al. .... 174/120 SR |
| 2011/0100677 A1* | 5/2011 | Chen et al. ................. 174/126.2 |
| 2011/0174519 A1* | 7/2011 | Shah et al. ..................... 174/119 |
| 2011/0226509 A1* | 9/2011 | Kim et al. .................. 174/126.2 |
| 2011/0266023 A1* | 11/2011 | Doneker et al. .......... 174/105 R |
| 2012/0076318 A1* | 3/2012 | Aase et al. ........................ 381/74 |
| 2012/0076342 A1* | 3/2012 | Weber et al. .................. 381/384 |
| 2012/0091112 A1* | 4/2012 | Wei ................................ 219/202 |
| 2012/0097421 A1* | 4/2012 | Gundel ..................... 174/113 R |
| 2012/0125656 A1* | 5/2012 | Wei et al. ....................... 174/103 |
| 2012/0163758 A1* | 6/2012 | McCullough et al. ........ 385/101 |
| 2012/0168199 A1* | 7/2012 | McCullough et al. .... 174/113 R |

FOREIGN PATENT DOCUMENTS

| | | |
|---|---|---|
| JP | 2008526683 | 7/2008 |
| JP | 2009184910 | 8/2009 |

* cited by examiner

EARPHONE CABLE AND EARPHONE USING THE SAME

CROSS-REFERENCE TO RELATED APPLICATIONS

This application claims all benefits accruing under 35 U.S.C. §119 from China Patent Application No. 200910189819.6, filed on Aug. 25, 2009, in the China Intellectual Property Office. This application is related to commonly-assigned application entitled, "EARPHONE CABLE AND EARPHONE USING THE SAME", filed on Apr. 29, 2010, Ser. No. 12/769,996.

1. Technical Field

The present disclosure relates to accessory for audio devices and, particularly, to an earphone cable and an earphone using the same.

2. Description of Related Art

Earphones are widely used for audio devices such as radios, Walkmans, CD players, mp3 players, mobile phones, and computers. An earphone includes an earphone cable, a plug electrically connected to one end of the earphone cable, and a housing connected to the other end of the earphone cable. The earphone cable is an audio cable that comprises a positive signal wire, a negative signal wire, and an out jacket layer covering the positive signal wire and the negative signal wire. The housing accommodates an acoustic transducer therein. The acoustic transducer is electrically connected to the signal wires in the earphone cable. The signal wires are made of highly conductive metal such as copper or aluminum. However, the strength of the earphone cable simply using copper or aluminum wires is relatively low. In use, the earphone cable is usually twisted or stretched. The signal wires in the earphone cable may be damaged or broke caused by fatigue fracture of the metal.

What is needed, therefore, is to provide a stronger earphone cable and earphone using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
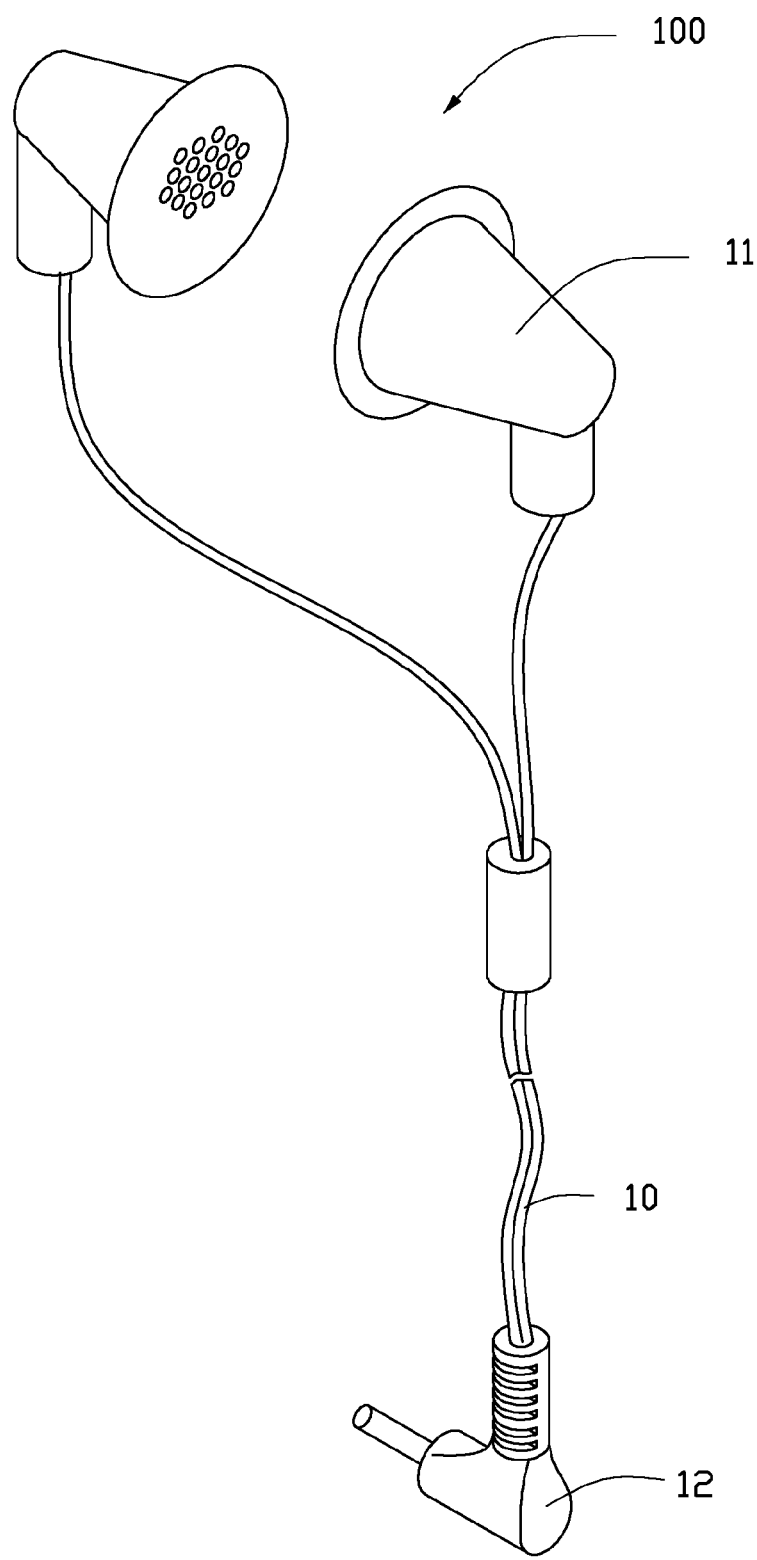
FIG. 1 is a schematic structural view of an embodiment of an earphone.

Referring to FIG. 1, an earphone 100 in one embodiment includes an earphone cable 10, a loudspeaker 11 electrically connected to one end of the earphone cable 10, and a connector 12 electrically connected to the other end of the earphone cable 10.

Figure 2:
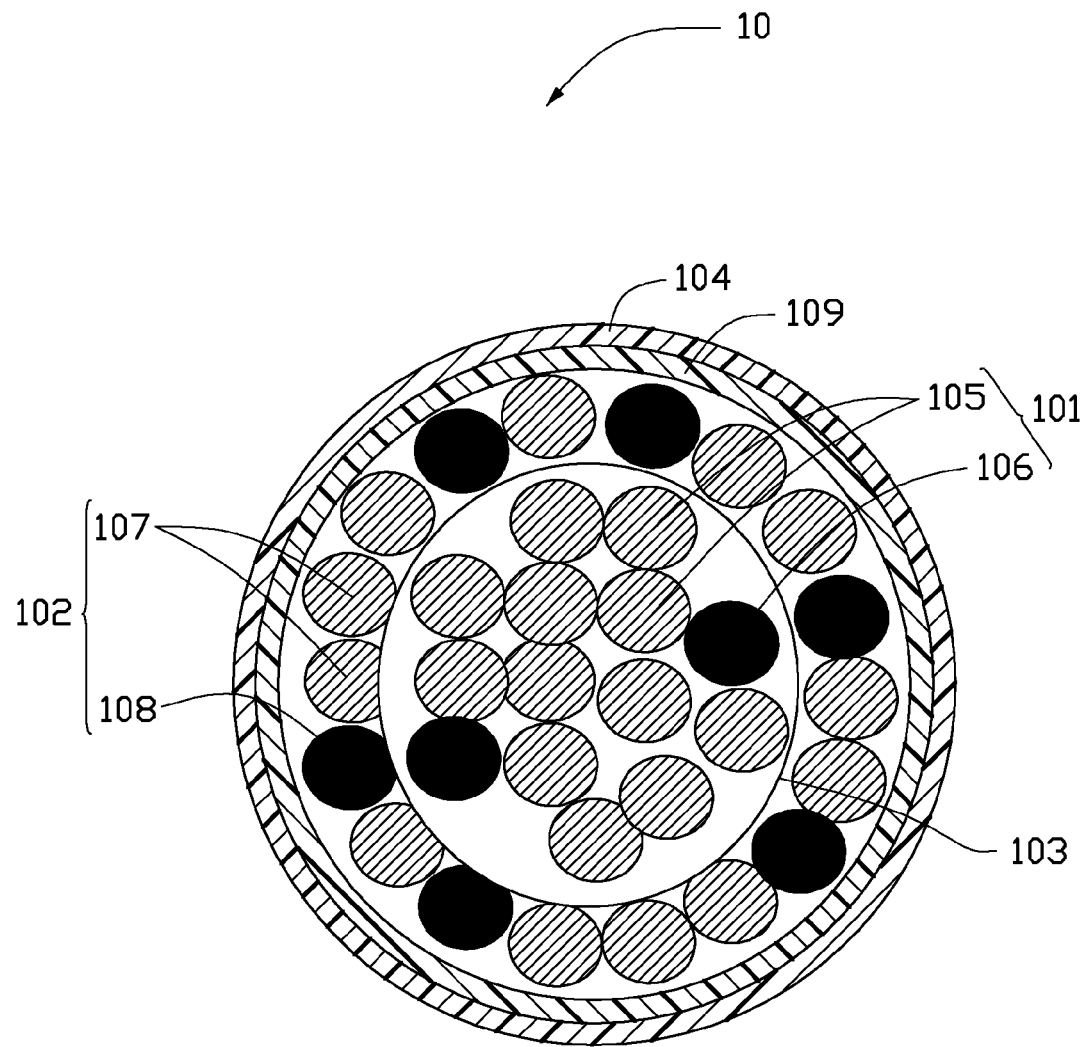
FIG. 2 is a cross-sectional view of an embodiment of an earphone cable that includes one signal sub-cable of the earphone.

The earphone cable 10 is used for transmitting and supplying electrical signals generated from signal generator (not shown). The signal generator can be a mobile phone, a Walkman, a CD player, an mp3 player, or a computer. Referring to FIG. 2, the earphone cable 10 includes a first signal wire group 101, a second signal wire group 102, an insulating layer 103 located between the first signal wire group 101 and the second signal wire group 102, and a sheath layer 104 located about the first signal wire group 101 and the second signal wire group 102. The first and second signal wire group 101 and 102 can be respectively connected to a first electrode and a second electrode of the connector 12. In use, the connector 12 is connected with the signal generator, and the electrical signals are transmitted from the connector 12 through the first signal wire group 101 and the second signal wire group 102 to the loudspeaker 11.

The first signal wire group 101 is coaxially arranged with the second signal wire group 102. The first signal wire group 101 includes a plurality of first conducting wires 105 and at least one first carbon nanotube wire 106. The first conducting wires 105 can be parallel to the first carbon nanotube wire 106 or coiled around the first carbon nanotube wire 106 to form a helix shaped wire.

Figure 3:
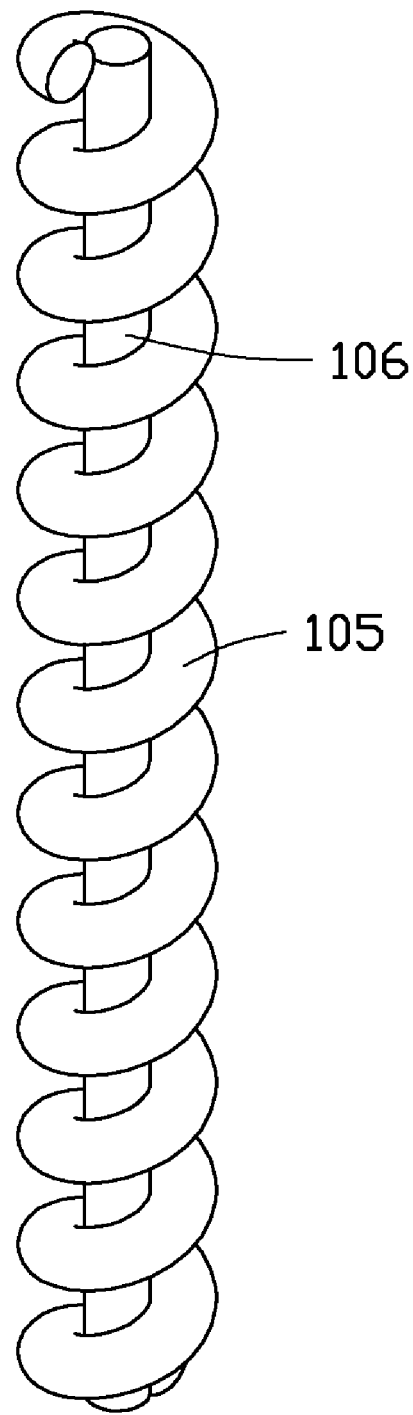
FIG. 3 is a schematic structural view of a conducting wire coiled around a carbon nanotube wire in the earphone cable.

In one embodiment, the first conducting wires 105 are coiled around the first carbon nanotube wire 106. The coiled first conducting wires 105 can improve the toughness of the earphone cable 10. Referring to FIG. 3, one first conducting wire 105 is coiled around one first carbon nanotube wire 106. It is noteworthy that more than one first conducting wire 105 can be coiled on the same or different first carbon nanotube wire 106.

In the embodiment shown in FIG. 2, the first conducting wires 105 are parallel to the first carbon nanotube wires 106. The plurality of first conducting wires 105 can be bound into a group with desired cross-section shape. For example, the plurality of first conducting wires 105 and a plurality of first carbon nanotube wires 106 can be bound into a group with a round cross-section, which is convenient for packing and storage.

The second signal wire group 102 includes a plurality of second conducting wires 107 and at least one second carbon nanotube wire 108. Similar to the first conducting wires 105, the second conducting wires 107 can be parallel to the second carbon nanotube wire 108 or coiled around the second carbon nanotube wire 108 to form a helix shaped wire.

In the embodiment shown in FIG. 2, the second signal wire group 102 includes a plurality of second conducting wires 107 and a plurality of second carbon nanotube wires 108. The second conducting wires 107, the second carbon nanotube wires 108, the first conducting wires 105, and the first carbon nanotube wires 106 are parallel to each other. The second conducting wires 107 and the second carbon nanotube wires 108 are uniformly located on the insulating layer 103, and around the first signal wire group 101 to form a ring shaped cross-section of the second signal wire group 102. The first signal wire group 101 is a core, and the second signal wire group 102 is a shell of the core. The first signal wire group 101 and the second signal wire group 102 form a core-shell structure. The first signal wire group 101 is located inside the second signal wire group 102. In one embodiment, the sum number of the second carbon nanotube wires 108 and second conducting wires 107 are just enough for them to arrange uniformly around the outer circumferential surface of the insulating layer 103. In other embodiments, there is only one second conducting wire 107 or one second carbon nanotube wire 108, along the radial direction of the cross-section of the second signal wire group 102. The first and second carbon nanotube wires 106 and 108 have better anti-fatigue and anti-fracture property than metal wires, therefore can provide a cushion effect to the earphone cable 10 as it is twisted and/or stretched during use. To uniformly provide the cushion effect, the first and second carbon nanotube wires 106 and 108 can be respectively and uniformly located among the first and second conducting wires 105 and 107. There can be at least one second conducting wire 107 located between the two adjacent second carbon nanotube wires 108.

In another embodiment, the second carbon nanotube wires 108 and the second conducting wires 107 of the second signal wire group 102 can be woven together to form a textile and wrap outside the group of the first signal wire group 101. In other embodiments, the first carbon nanotube wires 105 and the first carbon nanotube wires 106 can also be woven together to form a bundle shaped first signal wire group 101

To improve the transmission stability of the electrical signals in the earphone cable 10, the resistances of the first signal wire group 101 and the second signal wire group 102 are usually the same. Therefore, the structure and number of the first conducting wires 105 and the structure and number of the second conducting wires 107 can be arranged to be the same, and the structure and number of the first carbon nanotube wires 106 and the structure and number of the second carbon nanotube wires 108 can be arranged to be the same.

The material of the first and second conducting wires 105 and 107 can comprise metal with high conductivity, such as copper, aluminum, or gold. In the embodiment shown in FIG. 2, the first and second conducting wires 105 and 107 are made of copper. For avoiding the electromagnetic interference between the first and second conducting wires 105 and 107, an insulating coating can be covered on the outer surface of each of the first conducting wires 105 and each of the second conducting wires 107. The material of the insulating coating can comprise enamel, plastic, rubber, or polymer. The first and second carbon nanotube wires 106 and 108 can also have an insulating coating thereon.

The first and second carbon nanotube wires 106 and 108 in the earphone cable 10 can bear pulling force or dragging force, and/or twisting force during the use of the earphone cable 10. The first and second carbon nanotube wires 106 and 108 can be respectively connected to a first electrode and a second electrode of the connector 12. The first and second carbon nanotube wires 106 and 108 also have a good conductivity, and can also be conducting wires if the first conducting wires 105 or the second conducting wires 107 are broken. Accordingly, the lifetime of the earphone cable 10 is prolonged.

The first and second carbon nanotube wires 106 and 108 each includes a plurality of carbon nanotube segments joined end to end by van der Waals attractive force therebetween. The segments comprise carbon nanotubes aligned side by side and held together by van der Waals attractive force therebetween. The carbon nanotube wires 106, 108 will have carbon nanotubes, in different segments, that are joined end-to-end by van der Waals attractive force therebetween. The first and second carbon nanotube wires 106 and 108 each can be an untwisted carbon nanotube wire or a twisted carbon nanotube wire. A diameter of each of the first and second carbon nanotube wires 106 and 108 can be in an approximate range from 4.5 nanometers to 100 micrometers.

Figure 4:
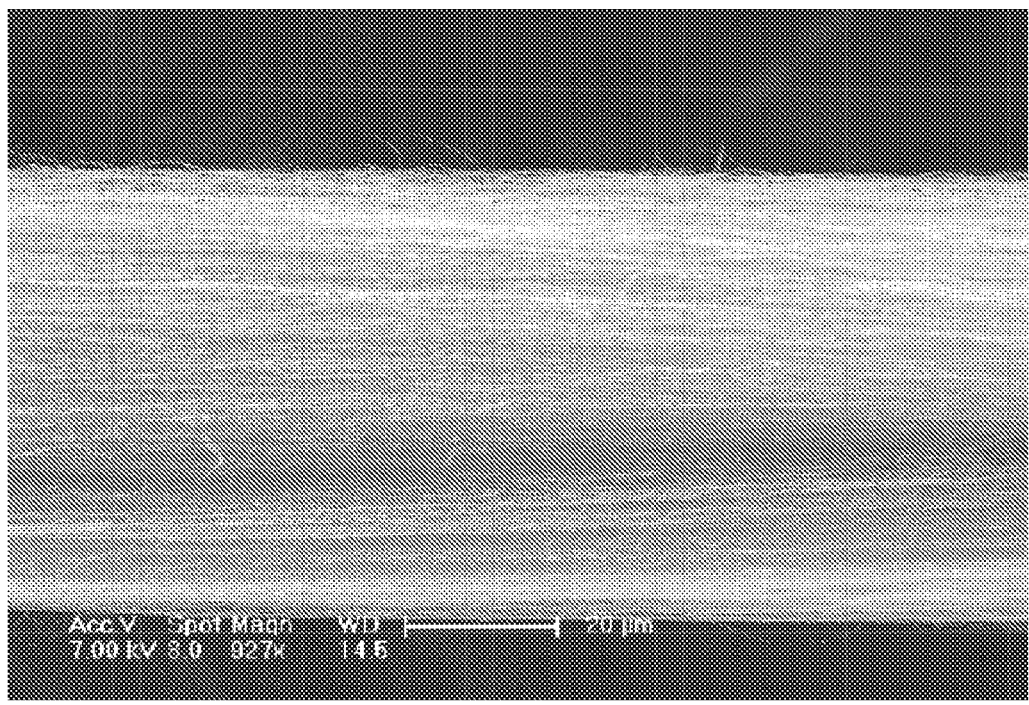
FIG. 4 shows a Scanning Electron Microscope (SEM) image of an untwisted carbon nanotube wire.

Referring to FIG. 4, the untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force there between. Each carbon nanotube segment includes a plurality of carbon nanotubes substantially parallel to each other, and joined by van der Waals attractive force therebetween. The carbon nanotube segments can vary in width, thickness, uniformity and shape. Length of the untwisted carbon nanotube wires can be arbitrarily set as desired. The untwisted carbon nanotube wire is formed by treating the carbon nanotube film drawn from a carbon nanotube array with an organic solvent. Specifically, the carbon nanotube film is treated by applying the volatile organic solvent to the carbon nanotube film to soak the entire surface of the carbon nanotube film, thereby shrinking the carbon nanotube film into the untwisted carbon nanotube wire.

Figure 5:
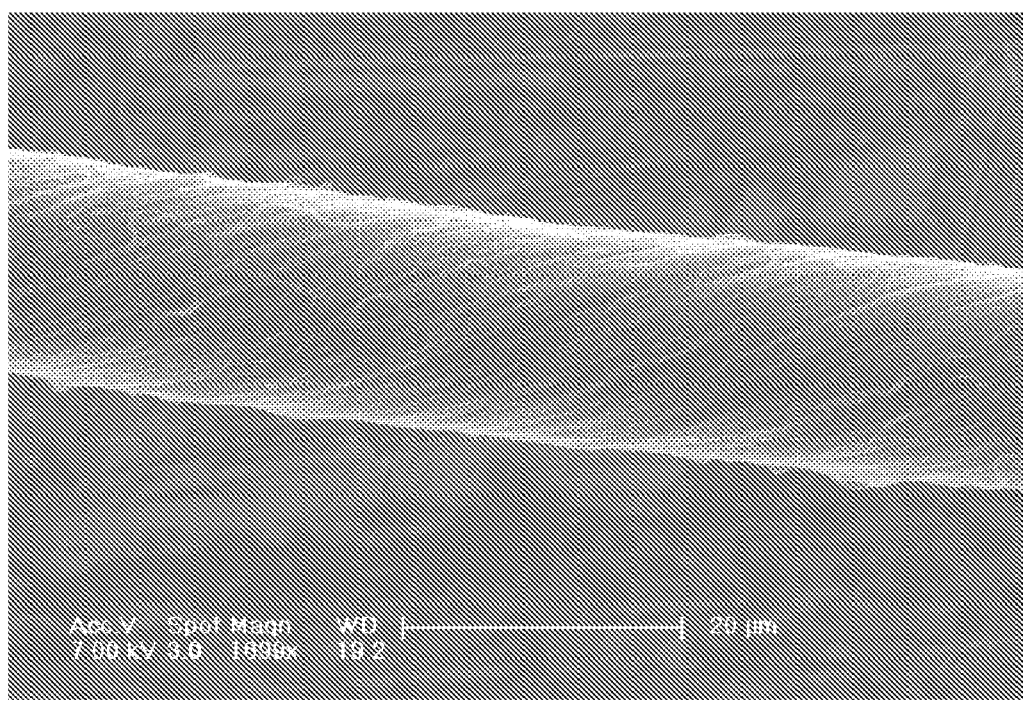
FIG. 5 shows a Scanning Electron Microscope (SEM) image of a twisted carbon nanotube wire.

Referring to FIG. 5, the twisted carbon nanotube wire includes a plurality of carbon nanotubes oriented around an axial direction of the twisted carbon nanotube wire. The carbon nanotubes are aligned around the axis of the carbon nanotube twisted wire like a helix. More specifically, the twisted carbon nanotube wire includes a plurality of successive carbon nanotube segment joined end to end by van der Waals attractive force therebetween. Length of the carbon nanotube wires can be arbitrarily set as desired. The twisted carbon nanotube wire is formed by twisting a carbon nanotube film drawn from a carbon nanotube array by using a mechanical force to turn the two ends of the carbon nanotube film in opposite directions.

Further, the twisted carbon nanotube wire can also be treated with a volatile organic solvent. After being soaked by the organic solvent, the adjacent paralleled carbon nanotubes in the twisted carbon nanotube wire will bundle together, due to the surface tension of the organic solvent when the organic solvent volatilizes. The specific surface area of the twisted carbon nanotube wire will decrease after being treated. The density and strength of the treated twisted carbon nanotube wire will increase as compared to an untreated carbon nanotube wire.

The carbon nanotubes in the first and second carbon nanotube wires 106 and 108 can be joined end to end by van der Waals attractive force therebetween. The carbon nanotubes in the first and second carbon nanotube wires 106 and 108 can be at least one of single-walled carbon nanotubes, double-walled carbon nanotubes, and multi-walled carbon nanotubes. Diameters of the single-walled carbon nanotubes approximately can range from 0.5 nanometers to 10 nanometers. Diameters of the double-walled carbon nanotubes approximately can range from 1 nanometer to 50 nanometers. Diameters of the multi-walled carbon nanotubes approximately can range from 1.5 nanometers to 50 nanometers.

The insulating layer 103 is used for insulation between the first signal wire group 101 and the second signal wire group 102. The material of the insulating layer 103 can comprise at least one of polytetrafluoroethylene (PTFE), polyethylene, polypropylene, and polystyrene. The material of the insulating layer 103 can also comprise nano-clay-polymer composite materials. The nano-clay is nano sized layered silicate clay such as nano-kaolin clay or nano-montmorillonite, which has good flame retardant properties. The polymer can be at least one but not limited to silicone resin, polyamide, or polyolefins (e.g., polyethylene or polypropylene).

The sheath layer 104 provides a protection to the entire earphone cable 10, especially for the second signal wire group 102. The sheath layer 104 is made of insulating material such as nano-clay-polymer composite materials. The nano-clay can be nano-kaolin clay or nano-montmorillonite. The polymer can be, but not limited to, silicon resin, polyamide, and polyolefin such as polyethylene or polypropylene. In one embodiment, the sheath layer 140 is made of nano-clay-polymer composite materials. The nano-clay-polymer composite material has good mechanical property, fire-resistant property, and can provide protection against damage from machinery or chemical exposure.

In one embodiment, the earphone cable 10 can further include a shielding layer 109 about the first signal wire group 101 and the second signal wire group 102. The shielding layer 109 shields electromagnetic signals or external signals to avoid the outside interference to the electrical signal transmission of the earphone cable 10. In the embodiment shown in FIG. 2, the shielding layer 109 surrounds the outer circumferential surface of the second signal wire group 102. The sheath layer 104 covers the outer circumferential surface of the shielding layer 109. The first and second signal wire groups 101 and 102, the insulating layer 103, the shield layer 109, and the sheath layer 104 are coaxial.

The shielding layer 109 is made of electrically conductive material. The shielding layer 109 can be a wound foil, a woven tape, or a braid. In one embodiment, the shielding layer 109 can be formed by woven wires or by winding films around the second signal wire group 102. The wires can be metal wires, carbon nanotube wires or composite wires having carbon nanotubes. The films can be metal foils, carbon nanotube films or a composite film having carbon nanotubes. The carbon nanotube wires and carbon nanotube films can include a plurality of carbon nanotubes oriented along a preferred direction, joined end to end, and combined by van der Waals attractive force. The carbon nanotube wire can be an untwisted carbon nanotube wire or twisted carbon nanotube wire.

Furthermore, the earphone cable 10 can include a plurality of signal sub-cables. Each signal sub-cable includes a pair of first and second signal wire groups 101 and 102. The plurality of signal sub-cables can be coaxially arranged, parallel to each other or twisted with each other, in the sheath layer 104.

Figure 6:
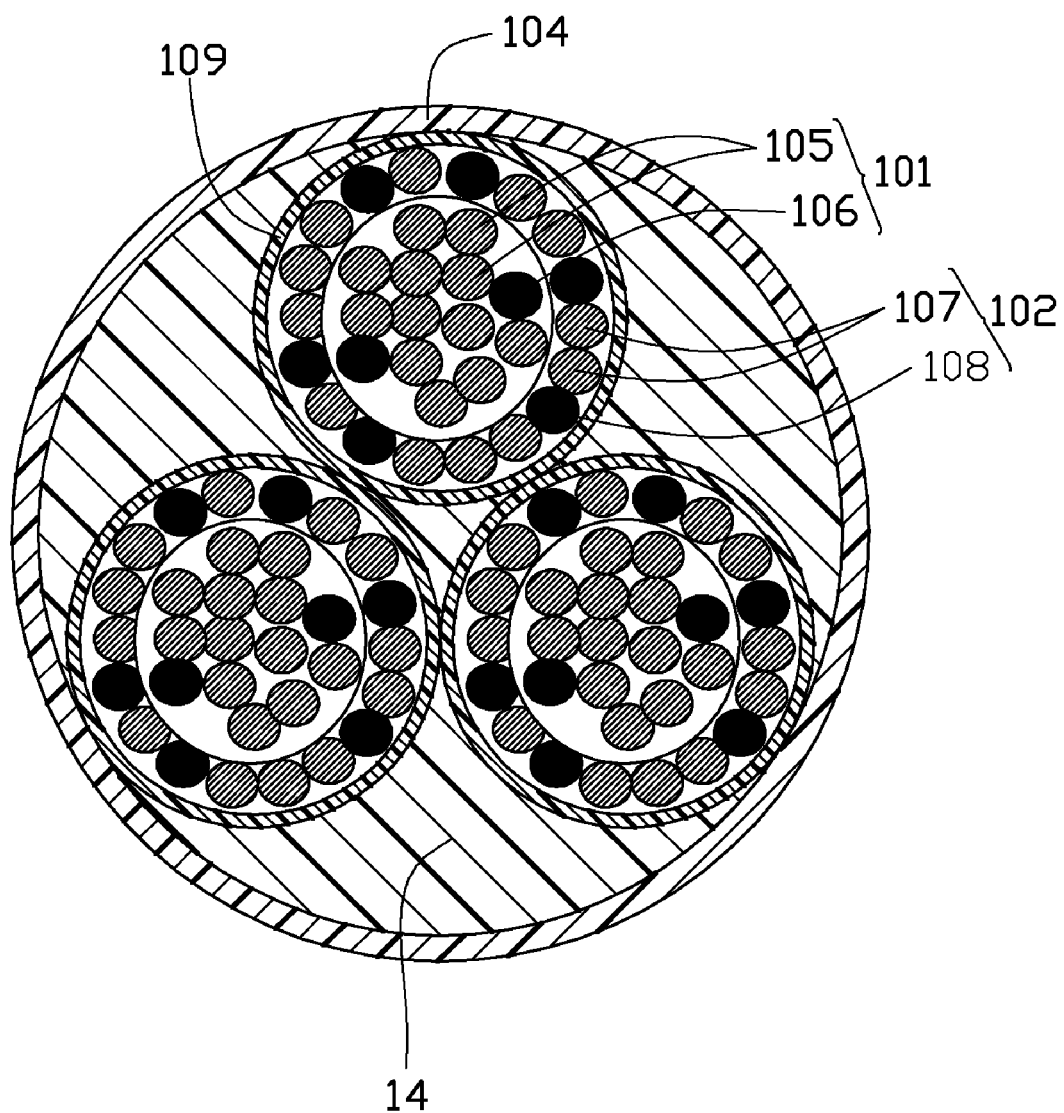
FIG. 6 is a schematic connection view of an embodiment of an earphone cable that includes three signal sub-cables of the earphone.

Referring to FIG. 6, the earphone cable 10 includes three signal sub-cables. In each signal sub-cable, the first signal wire group 101 is a core, and the second signal wire group 102 is a shell of the core, and the first signal wire group 101 and the second signal wire group 102 forms a core-shell structure.

The earphone cable 10 can also include more than one shielding layer 109. The number of the shielding layers 109 can correspond to the number of the signal sub-cables. Each shielding layer 109 can be located on the outer circumferential surface of each second signal wire group 102.

Furthermore, the earphone cable 10 can further include a filler 14 filling the gap between the signal sub-cables, in the sheath layer 104, achieving a stable earphone cable 10 with relatively round outer surface.

The loudspeaker 11 is a transducer to transform the electrical signals to the sound signals. The loudspeaker 11 can have an electro-dynamic structure including a voice coil, a magnet, and a cone. The voice coil is an electrical conductor, and is placed in the magnetic field of the magnet. By applying an electrical current to the voice coil, a mechanical vibration of the cone is produced due to the interaction between the electromagnetic field produced by the voice coil and the magnetic field of the magnets, thus producing sound waves by kinetically pushing the air. The cone will reproduce the sound pressure waves, corresponding to the original electrical signals.

The loudspeaker 11 can also have a thermoacoustic structure including a thermoacoustic film and two electrodes. The thermoacoustic film, which should have a very high specific surface area and very low heat capacity per unit area, can be a carbon nanotube film drawn from the carbon nanotube array. When electrical signals are conducted through the thermoacoustic film, heat is produced in the thermoacoustic film according to the variations of the signals and/or signal strengths. Heat is propagated into surrounding medium. The heating of the medium causes thermal expansion and produces pressure waves in the surrounding medium, resulting in sound wave generation.

The connector 12 can include a first electrode and a second electrode. The first electrode and the second electrode are insulated from each other, and electrically connected to the first signal wire group 101 and the second signal wire group 102 in a one to one manner. In one embodiment, two earphone cables 10 can both be electrically connected to the same connector 12.

The carbon nanotube has high mechanical properties, such as high strength, toughness, and modulus of elasticity. Thus, the earphone cable 10 including a plurality of oriented carbon nanotubes joined end-to-end by van der Waals attractive force has high strength and toughness, and has a good endurance of twisting, folding, and stretching. With the same diameter, the earphone cable 10 using carbon nanotube wire has better tensile strength than simply using the metal wires. The carbon nanotube has lower weight than metals, thus, the weight of the earphone cable decreases.

It is to be understood that the above-described embodiments are intended to illustrate rather than limit the invention. Any elements described in accordance with any embodiments is understood that they can be used in addition or substituted in other embodiments. Embodiments can also be used together. Variations may be made to the embodiments without departing from the spirit of the invention. The above-described embodiments illustrate the scope of the invention but do not restrict the scope of the invention.

What is claimed is:

1. A signal cable comprising:
   a first signal wire group comprising at least one first conducting wire;
   a second signal wire group insulated from the first signal wire group, the second signal wire group comprising at least one second conducting wire; and
   a sheath layer about the first signal wire group and the second signal wire group, wherein at least one of the first signal wire group and the second signal wire group comprises at least one carbon nanotube wire.

2. The signal cable of claim 1 further comprising an insulating layer located between the first signal wire group and the second signal wire group.

3. The signal cable of claim 2, wherein the at least one first conducting wire comprises a plurality of first conducting wires, the at least one second conducting wire comprises a plurality of second conducting wires, and the at least one carbon nanotube wire comprises a plurality of first carbon nanotube wires in the first signal wire group and a plurality of second carbon nanotube wires in the second signal wire group.

4. The signal cable of claim 3, wherein the plurality of first conducting wires and the plurality of first carbon nanotube wires are bound into a bunch, the insulating layer surrounds the bunch, the plurality of second conducting wires and the plurality of second carbon nanotube wires surround the insulating layer, and the sheath layer surrounds the second signal wire group.

5. The signal cable of claim 3, wherein the plurality of second carbon nanotube wires and the plurality of second conducting wires are weaved together and located about the first signal wire group.

6. The signal cable of claim 1, wherein the at least one carbon nanotube wire is a twisted carbon nanotube wire, the twisted carbon nanotube wire comprises a plurality of carbon nanotubes, the plurality of carbon nanotubes are joined end-to-end by van der Waals attractive force therebetween, and are helically aligned around an axial direction of the twisted carbon nanotube wire.

7. The signal cable of claim 1, wherein the at least one carbon nanotube wire is an untwisted carbon nanotube wire, the untwisted carbon nanotube wire comprises a plurality of carbon nanotubes, the plurality of carbon nanotubes are joined end-to-end by van der Waals attractive force therebetween, and are aligned along an axial direction of the untwisted carbon nanotube wire.

8. The signal cable of claim 1, wherein a diameter of the at least one carbon nanotube wire is in a range from about 4.5 nanometers to about 1 millimeter.

9. The signal cable of claim 1, wherein the first signal wire group comprises the at least one carbon nanotube wire, the at least one first conducting wire is coiled around the at least one carbon nanotube wire.

10. The signal cable of claim 1, wherein the first signal wire group comprises the at least one carbon nanotube wire, and the at least one first conducting wire is substantially parallel to the at least one carbon nanotube wire.

11. The signal cable of claim 1, wherein the second signal wire group comprises the at least one carbon nanotube wire, and the at least one second conducting wire is coiled around the at least one carbon nanotube wire.

12. The signal cable of claim 1, wherein the second signal wire group comprises the at least one carbon nanotube wire, and the at least one second conducting wire is substantially parallel to the at least one carbon nanotube wire.

13. The signal cable of claim 1 further comprising a shielding layer covered by the sheath layer and located about the first signal wire group and the second signal wire group.

14. The signal cable of claim 1, wherein the first signal wire group is coaxial with the second signal wire group.

15. A signal cable comprising:
   more than one signal sub-cable, each signal sub-cable comprising:
      a first signal wire group comprising at least one first conducting wire; and
      a second signal wire group insulated from the first signal wire group, the second signal wire group comprising at least one second conducting wire, wherein at least one of the first signal wire group and the second signal wire group comprises at least one carbon nanotube wire; and
   a sheath layer about the more than one signal sub-cable.

16. The signal cable of claim 15, wherein the at least one first conducting wire comprises a plurality of first conducting wires, the at least one second conducting wire comprises a plurality of second conducting wires, and the at least one carbon nanotube wire comprises a plurality of first carbon nanotube wires in the first signal wire group and a plurality of second carbon nanotube wires in the second signal wire group.

17. The signal cable of claim 16, wherein each of the more than one signal sub-cable further comprises an insulating layer, the plurality of first conducting wires and the plurality of first carbon nanotube wires are bound into a bunch, the insulating layer are located about the group, and the second conducting wires and the second carbon nanotube wire are located about the insulating layer.

18. The signal cable of claim 17, wherein each signal sub-cable further comprises a shielding layer located about the second signal wire group.

19. The signal cable of claim 16 further comprising a filler located in the sheath layer between the more than one signal sub-cable.

20. An earphone comprising:
   a signal cable comprising:
      a first signal wire group comprising at least one first conducting wire,
      a second signal wire group insulated from the first signal wire group, the second signal wire group comprising at least one second conducting wire, and
      a sheath layer located about the first signal wire group and the second signal wire group, wherein at least one of the first signal wire group and the second signal wire group comprises at least one carbon nanotube wire; and
   a loudspeaker electrically connected to one end of the signal cable; and
   a connector electrically connected to the other end of the signal cable.

* * * * *